United States Patent Office 3,557,085
Patented Jan. 19, 1971

3,557,085
PROCESS FOR THE RECOVERY OF CITRUS PEEL OIL
Peter L. Douglas, Glendora, Calif., assignor to Automatic Machinery & Electronics, Inc., Covina, Calif., a corporation of California
No Drawing. Filed Feb. 29, 1968, Ser. No. 709,197
Int. Cl. C07g 17/00
U.S. Cl. 260—236.6                 10 Claims

ABSTRACT OF THE DISCLOSURE

In the process of recovering citrus peel oil wherein the oil is expressed from the peel of the fruit and captured in water to provide a dilute mixture or emulsion containing the oil, the dilute mixture or emulsion is fed to a desludging operation which removes most of the insoluble solids and concentrates the oil emulsion into a cream, the cream then being fed to a polishing operation to break the emulsion and produce a clear citrus peel oil; the improvement wherein calcium chloride is added to the dilute mixture or emulsion prior to the desludging operation to facilitate the recovery of the oil from the cream in the polishing step without the use of any wetting agents.

BACKGROUND OF THE INVENTION

In modern processes of citrus peel oil recovery, the oil is expressed from the peel of the fruit and captured in water making a dilute mixture or emulsion containing on the order of about 1% oil by volume. This dilute liquor is fed to a desludging centrifuge which removes most of the insoluble solids and concentrates the oil emulsion into a cream containing on the order of about 50% to 75% citrus oil by weight. The cream is then fed to a polishing centrifuge which breaks the emulsion and produces the clear citrus peel oil. The cream from the desludger is generally very thick and hence hard to break in the polishing centrifuge, resulting in poor efficiency and the loss of substantial quantities of valuable citrus peel oil. Heretofore, various wetting agents and the like have been utilized in an effort to break the cream emulsion. It has also been previously known that the effect of the wetting agent can be further increased by the concurrent use of certain electrolyte salts which are beneficial in cooperating with the wetting agent to break the emulsion. However, it has been recognized that the use of wetting agents in the breaking of the emulsion is undesirable since it is difficult to remove all of the wetting agents from the final oil product. The food trade generally desires a citrus peel oil which is free of wetting agents and other similar materials which contaminate the product. Therefore, there has been a long felt need for an improved method of breaking citrus peel oil emulsions without the need for the use of wetting agents. The present invention is directed to the solving of this long-standing problem. More particularly, according to the present invention, it has been quite surprisingly found that the addition of calcium chloride to the dilute mixture of oil and water ahead of the desludging operation results in a cream which is easier to break in the polisher, and that the addition of the calcium chloride in the manner just described provides excellent breaking of the emulsion in the polisher without the need for the use of any wetting agents.

SUMMARY OF THE INVENTION

Briefly, the present invention comprises the process of recovery citrus peel oil by expressing the oil from the peel of the fruit and capturing the same in water to provide a dilute mixture or emulsion, feeding the mixture or emulsion to a desludging operation to remove most of the insoluble solids and concentrate the oil emulsion into a cream, feeding the cream to a polishing operation to break the emulsion and produce a clear citrus peel oil; the improvement wherein calcium chloride is added to the dilute mixture or oil prior to the desludging operation to facilitate the recovery of the oil from the cream in the polishing step without the use of any wetting agents.

It is an object of the present invention to provide an improved method for the recovery of citrus peel oil.

More particularly, it is an object of the present invention to provide an improved method for breaking the cream emulsion involved in citrus peel oil recovery without the need for contaminating wetting agents.

It is also an object of the invention to provide a means of separating the citrus peel oil in a centrifuge with less contamination of the centrifuge.

These and other objects and advantages of the present invention will be apparent from the more detailed description which follows.

DESCRIPTION OF PREFERRED EMBODIMENTS

While not bound by any theory, it is believed that the calcium chloride reacts with the pectin in the dilute emulsion to form insoluble calcium pectates which have reduced emulsifying power, thus simplifying the task of breaking the emulsion.

In general, according to the present invention the calcium chloride is added to the dilute feed liquor obtained from expressing the oil from the citrus peel. The amount of calcium chloride added to the dilute feed liquor is an effective emulsion breaking amount which generally varies within a range up to 2 or 3 or 4% by weight and down to as low as about 0.05% by weight. It has been found, for example, that the use of 0.5% by weight calcium chloride in the dilute feed liquor is particularly effective in causing the cream produced in the desludging operation to easily separate in the polisher.

With the quantity of water used in oil processing (on the order of 120 gallons per ton of fruit), it is contemplated that the calcium chloride solution would be reused. This can be done by recirculating the discharge from the desludger back to the point where the oil is expressed from the fruit. The calcium chloride in the recycle can be maintained at the original level by replacement to take care of the amount of calcium chloride used in the process.

The various apparatus employed in the practice of this invention is already familiar to those skilled in the art, and hence its construction and arrangement need not be described in this patent.

The following examples are presented solely to illustrate the invention. In the examples the parts and percentages are by weight unless otherwise indicated.

EXAMPLE I

Calcium chloride was added to the dilute feed liquor (produced by expressing the peel of oranges into water) to make a solution of 0.5% by weight and centrifuged in a desludging separator. The mixture from the centrifuge was a cream which upon standing separated into free oil. Control samples from the desludger containing no calcium chloride produce thick creams that showed no separation of free oil on standing.

EXAMPLE II

In this example, the calcium chloride in the dilute feed liquor was reduced to 0.05% by weight. The creams produced did not appear to be much different from the untreated controls; however, when both creams were polished on a polishing centrifuge, the cream containing the calcium chloride separated and the oil came over clear in one pass while the control samples yielded an oil which was cloudy or emulsified. In addition, the polishing centrifuge bowl remained cleaner where the calcium chloride was present than was the case where the calcium chloride was not present.

In general, the present invention is applicable to the recovery of any citrus oil including lemon, lime, orange, grapefruit, tangerine and the like. Those skilled in the art will readily recognize that many variations are possible within the scope of the present invention.

I claim:

1. In the process of recovering citrus peel oil wherein the oil is expressed from the peel of the fruit in the presence of water to provide a dilute emulsion containing the oil, the dilute emulsion is fed to a desludging operation which removes most of the insoluble solids and concentrates such oil emulsion into a cream, and the cream is then fed to a polishing operation to break the emulsion and separate the citrus peel oil from the cream to produce a clear citrus peel oil; the improvement wherein calcium chloride is added to said dilute emulsion prior to said desludging operation to facilitate separation of said oil from said cream in the polishing step whereby such separation may be effected without the use of wetting agents.

2. The process of claim 1 wherein the calcium chloride is used in an amount from about 0.05 to about 0.5% by weight of said dilute emulsion entering the desludging operation.

3. The process of claim 1 wherein the citrus peel oil is orange peel oil.

4. The process of claim 1 wherein the citrus peel oil is lime peel oil.

5. The process of claim 1 wherein the citrus peel oil is grapefruit peel oil.

6. The process of claim 1 wherein the citrus peel oil is lemon peel oil.

7. The process of claim 1 wherein the citrus peel oil is tangerine peel oil.

8. The process of claim 1 wherein the calcium chloride from the polishing operation is recycled to form at least part of the feed to the desludging operation.

9. The process of claim 1 in which said calcium chloride is used in an amount from about 0.05 to about 4.0 weight percent of said dilute emulsion.

10. In the process of recovering citrus peel oil in which the oil is expressed from the peel of the fruit in the presence of water to produce a dilute emulsion containing such oil, the dilute emulsion is fed to a desludging operation which removes most of the insoluble solids and concentrates such oil emulsion into a cream, and the cream is then fed to a polishing operation to break the concentrated emulsion and separate the citrus peel oil from such cream; the improvement in which about 0.05 to about 0.5 percent by weight of calcium chloride, based on the weight of the dilute emulsion, is added to said dilute emulsion prior to said desludging to facilitate the separation of said citrus peel oil from said cream in said polishing step.

References Cited
UNITED STATES PATENTS 2,296,004    9/1942    Platt _____ 260—236.6

HENRY R. JILES, Primary Examiner

S. D. WINTERS, Assistant Examiner

U.S. Cl. X.R.

99—103, 105